(12) United States Patent
Radmard et al.

(10) Patent No.: US 7,586,663 B1
(45) Date of Patent: *Sep. 8, 2009

(54) GEL POLYMER ELECTROLYTES

(75) Inventors: Bijan Radmard, Chelmsford, MA (US); Gregory A. Sotzing, Storrs, CT (US)

(73) Assignee: Triton Systems, Inc., Chelmsford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/365,186

(22) Filed: Mar. 1, 2006

Related U.S. Application Data

(60) Provisional application No. 60/664,350, filed on Mar. 23, 2005, provisional application No. 60/657,593, filed on Mar. 1, 2005.

(51) Int. Cl.
*G02F 1/15* (2006.01)

(52) U.S. Cl. .................. 359/265; 359/270; 345/49; 345/105

(58) Field of Classification Search .......... 359/265
See application file for complete search history.

(56) References Cited

U.S. PATENT DOCUMENTS

| | | | | |
|---|---|---|---|---|
| 4,537,826 | A * | 8/1985 | Miyamura et al. | 428/328 |
| 5,471,338 | A * | 11/1995 | Yu et al. | 359/273 |
| 5,663,829 | A | 9/1997 | Lefrou et al. | |
| 5,825,526 | A * | 10/1998 | Bommarito et al. | 359/265 |
| 6,214,251 | B1 * | 4/2001 | Wu et al. | 252/62.2 |
| 6,245,262 | B1 * | 6/2001 | Varaprasad et al. | 264/1.31 |
| 6,403,741 | B1 * | 6/2002 | Heuer et al. | 526/256 |
| 6,452,711 | B1 | 9/2002 | Heuer et al. | |
| 6,791,738 | B2 * | 9/2004 | Reynolds et al. | 359/265 |
| 2001/0030793 | A1 * | 10/2001 | Byker et al. | 359/265 |
| 2003/0164477 | A1 * | 9/2003 | Zhou et al. | 252/500 |
| 2003/0214695 | A1 * | 11/2003 | Abramson et al. | 359/265 |
| 2004/0233537 | A1 * | 11/2004 | Agrawal et al. | 359/604 |
| 2004/0242116 | A1 * | 12/2004 | Forrest et al. | 445/25 |
| 2005/0210672 | A1 * | 9/2005 | Reynolds et al. | 29/830 |
| 2006/0203322 | A1 * | 9/2006 | Radmard et al. | 359/265 |

OTHER PUBLICATIONS

Mischler, Georg. Lighting Design Knowledgebase, Lighting Design Glossary [online], copyright 1998-2003, [retrieved Nov. 20, 2006]. Retrieved from the Internet <URL: http://www.schorsch.com/kbase/glossary/contrast.html>.*

Argun et al., Multicolored Electrochromism in Polymers: Structures and Devices, 2004, Chem. Mater. Reviews 12(23):4401-4412.

(Continued)

*Primary Examiner*—Jessica T Stultz
(74) *Attorney, Agent, or Firm*—Pepper Hamilton LLP

(57) ABSTRACT

An electrochromic cell is disclosed which can include a first electrically conducting transparent electrode bonded to an electrochemically formed first electrochromic electrode on the surface of the electrode; a second electrically conducting transparent electrode bonded to an electrochemically formed second electrochromic electrode on the surface of the second electrode and a transparent gel polymer electrolyte formed from one or more macromomoners mixed with a plasticizer and an electrolyte salt, the gel polymer electrolyte in contact with both the first and second electrochromic electrodes; the first and second electrochromic electrodes are separated from each other.

Figure 1:
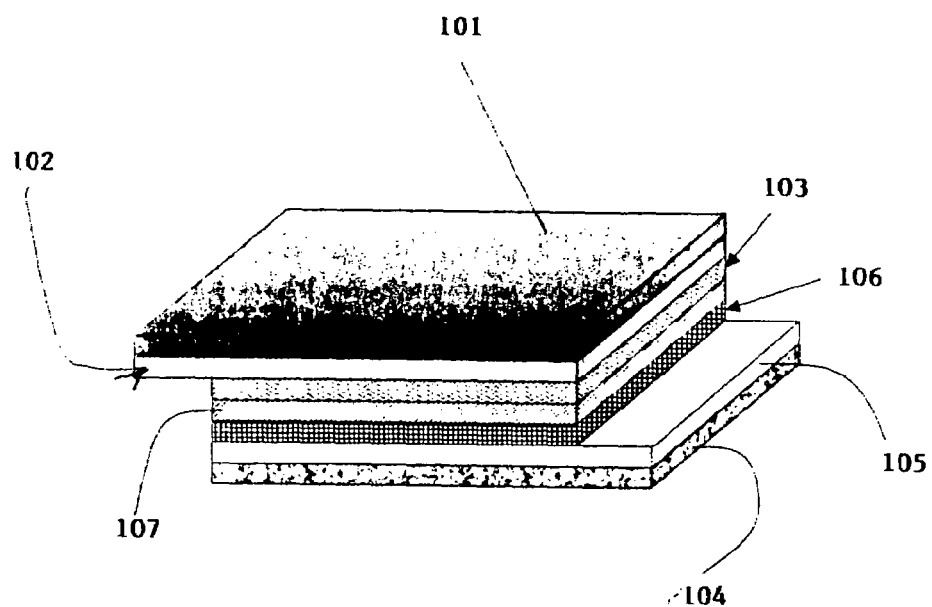

8 Claims, 13 Drawing Sheets
(2 of 13 Drawing Sheet(s) Filed in Color)

OTHER PUBLICATIONS

Granquist, Electrochromic tungsten oxide films: Review of progress 1993-1998, 2000, Solar Energy Materials and Solar Cells 60:201-262.
Hyodo, Electrochromism of Conducting Polymers, 1994, Electrochimica Acta 39(2):265-272.
Mortimer, Organic electrochromic materials, 1999, Electrochimica Acta 44:2971-2981.
Rosseinsky et al., Electrochromic Systems and the Prospects for Devices, 2001, J. Adv. Mater. 13(11):783-793.
Somani et al., Electrochromic materials and devices: present and future, 2003, Mater. Chem. and Phys. 77:117-133.
Sapp et al., Rapid Switching Solid Stare Electrochromic Devices Based on Complementary Conducting Polymer Films, 1996, Adv. Mater. 8(10):808-811.
Sapp et al., High Contrast Ratio and Fast-Switching Dual Polymer Electrochromic Devices, 1998, Chem. Mater. 10:2101-2108.
Ribeiro et al., Solid-state electrochromic device based on two poly(thiophene) derivatives, 2004, J. Electronal. Chem. 567:243-248.
Rocco et al., An Electrochromic Device Combining Polypyrrole and $WO_3$—I. Liquid Electrolyte, 1996, Electrochimica Acta 41(18):2805-2816.
Gustafsson-Carlberg et al., Tuning the Bandgap for Polymeric Smart Windows and Displays, 1995, Electrochimica Acta 40(13):2233-2235.
Rauh, Electrochromic windows: an overview, 1999, Electrochimica Acta 44:3165-3176.
Judd et al., Color in Business, Science and Industry, John Wiley & Sons, New York 1967 (TOC).
Wyszecki et al., Color Science: Concepts and Methods, Quantitative Data and Formulae, John Wiley & Sons, New York, 1982 (TOC).
Agnihotry et al., PMMA based gel electrolyte for EC smart windows, 1999, Electrochimica Acta 44:3121-3126.
Byker, Electrochromics and polymers, 2001. Electrochimica Acta 46:2015-2022.
Georen et al., Characterisation and modeling of the transport properties in lithium battery gel electrolytes: Part I. The ninary electrolyte $PC/LiCIO_4$, 2004, Electrochimica Acta 49:3497-3505.

Sekhon et al., Solvent effect on gel electrolytes containing lithium salts, 2000, Solid State Ionics 136:1189-1192.
Dias et al., Trends in polymer electrolytes for secondary lithium batteries, 2000, J. Power Sources 88:169-191.
Gazotti et al., Polymer electrolytes based on ethylene oxide-epichlorohydrin copolymers, 2000, Solid State Ionics 130:281-291.
Meyer, Polymer Electrolytes for Lithium-Ion Batteries, 1998, Adv. Mater. 10(6):439-448.
Song et al., Characterization of UV-cured gel polymer electrolytes for rechargeable lithium batteries, 2002, J. Power Sources 110:209-215.
Heuer et al., Electrochromic Window Based on Conducting Poly (3,4-ethylenedioxythiophene)- Poly(styrene sulfonate), 2002, Adv. Funct. Mater. 12(2):89-94.
Sotzing et al., Multiply Colored Electrochromic Carbazole-Based Polymers, 1997, Chem. Mater. 9:1578-1587.
Argun et al., The First Truly All-Polymer Electrochromic Devices, 2003, Adv. Mater. 15(15):1338-1341.
Delongchamp et al., Layer-by-Layer Assembly of PEDOT/ Polyaniline Electrochromic Devices, 2001, Adv. Mater. 13(19):1455-1459.
Ko et al., Characteristics of dual-type electrochromic device based on poly(3-tetradecylthiophene) and poly(3,4-ethylenedioxythiophene), 2004, Synth. Met. 143:31-35.
Grande et al., Intrinsic Asymmetry, Hysteresis, and Conformational Relaxation during Redox Switching in Polypyrrole: a Coulovoltametric Study, 1998, J. Phys. Chem. B 102:7535-7540.
Otero et al., Reinterpretation of Polypyrrole Electrochemistry after Consideration of Conformational Relaxation Processes, 1997, J. Phys. Chem. B. 101:3688-3697.
Otero et al., UV-Visible Spectroelectrochemistry of Conducting Polymers. Energy Linked to Conformational Changes, 1999, Langmuir 15:1323-1327.
Obrien et al., Electrochromic coatings-applications and manufacturing issues, 1999, Thin Solid Films 345:312-318.
Heckner et al., Similarities between electrochromic windows and thin film batteries, 2002, Solid State Ionics 152:899-905.
Draper at al., Electrochromic variable transmission optical combiner, 2005, Cockpit and Future Displays for Defense and Security, Proc. of SPIE 5801:268-277.

* cited by examiner

Fig. 3
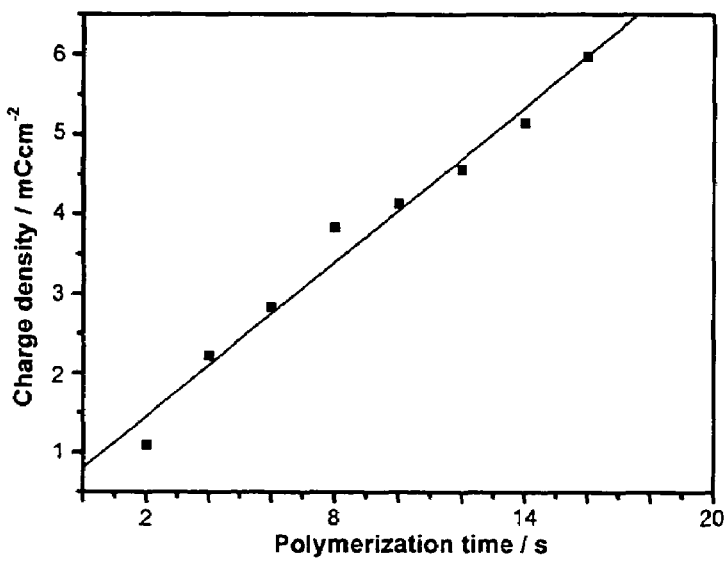
Fig. 3a
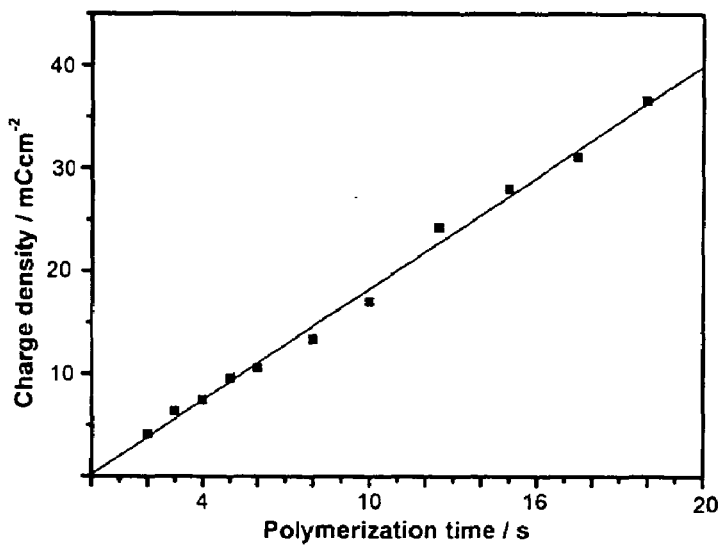
Fig. 3b

Fig. 11
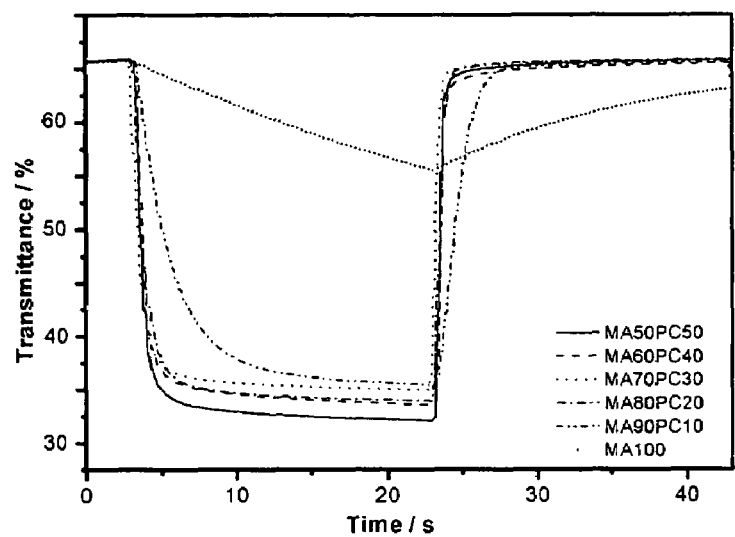
Fig. 11a
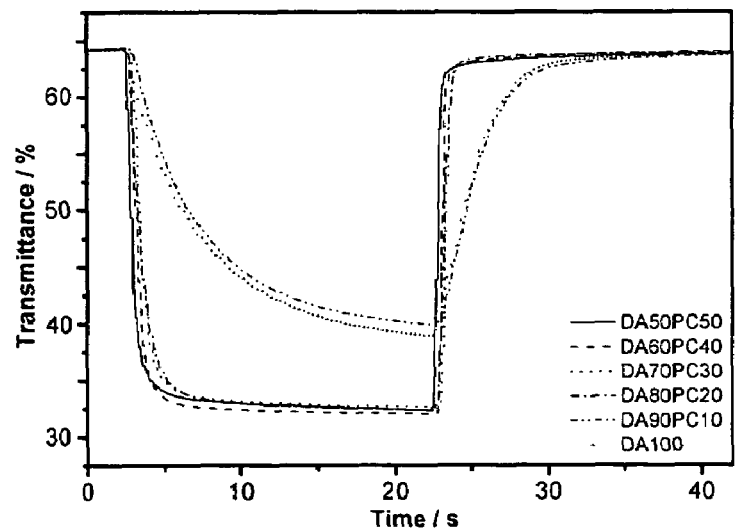
Fig. 11b

GEL POLYMER ELECTROLYTES

CROSS REFERENCES AND RELATED APPLICATIONS

This application claims priority from U.S. Provisional Application No. 60/657,593 entitled "GEL POLYMER ELECTROLYTES AND ELECTROCHROMIC DEVICES INCLUDING THEM" dated Mar. 1, 2005 and U.S. Provisional Application No. 60/664,350 entitled "GEL POLYMER ELECTROLYTES AND ELECTROCHROMIC DEVICES INCLUDING THEM" dated Mar. 23, 2005 herein incorporated by reference in their entireties.

BACKGROUND

Electrochromism refers to the ability to change the optical properties of a material upon application of a potential. The tunability of the optical properties of conjugated polymers as a function of potential makes them very useful electrochromic materials. Some of the key advantages of conjugated polymers over inorganic electrochromic materials include wide range of color tunability, ease of processing, low operational voltages and extraordinary color retention.

Both organic and inorganic materials have been used to design and construct electrochromic devices which work as electrochemical cells; the most simple configuration for one of these devices consist of a four layer assembly, a transparent electronic conductive film (usually ITO) covered by the electroactive material (organic or inorganic), an ionic conductive medium, and another transparent electronic conductive film to complete the cell. The use of only one electroactive film leads to short-life devices. Shortened device life is believed to be caused by the lack of a second electroactive film working as counter electrode; a second electrode would be able to complete the redox process in the cell and reduce or eliminate degradative reactions in the electrolyte. This issue has been addressed by the use of dual-type configurations, in which a fifth ion-storage layer, which could also have electrochromic function, is included in the assembly to work as counter electrode. This configuration could be used to obtain two mixed colored states or, using two materials with complementary optical characteristics, enhance the contrast between the previously defined states.

Among all the efforts made to obtain all possible combinations of colors in electrochromic devices, the possibility of switching between a transparent and a colored state has attained a lot of attention for its direct application in systems in which a control over the intensity of the light radiation passing through the device is pursued. Materials with the above characteristics can be incorporated into intelligent windows capable of providing constant light intensity irrespective of external illumination. Based on this property electrochromic materials have been proposed and demonstrated as potential candidates for rearview mirrors that eliminate glares, smart optical attenuation systems, displays, optical and electro-optical devices. Examples of these include architectural windows, goggles, and visors.

The common feature of all these applications is that they are able to modify the conditions in which the visible light is perceived by the human eye in a fixed situation. The human eye is a factor in the development of these devices because there are substantial differences in the way the eye perceives the visible spectrum under different conditions. Photopic and scotopic visions may be considered when making such systems.

There are two kinds of light receptors in human eye: cones and rods. The former is sensitive to even small radiations but cannot perceive the different colors and are used under low illuminations and the latter can yield perceptions of the different colors, but need more radiation to get activated and are predominantly used in well-illuminated conditions. The scotopic vision refers to situations wherein the cones are used under poorly illuminated situations and photopic vision is related to the use of rods under well-lit conditions. In each situation the eye is more sensitive to some wavelengths and less to others, so each wavelength has a relative weight in the overall spectrum perceived by the eye. The relative values for each wavelength have been standardized by the Commission Internationale de l'Eclairage (CIE).

There is a continued need for electrochromic devices with high switching speeds, that can be used a subjects eyes, and that have good contrast between colored or transmisive states. There is a continued need for gel-electrolytes for electrochromic systems that are able to transport the ions efficiently and are highly transparent.

SUMMARY

Embodiments of the current invention include electrochromic cells and devices that include electrochromic cells in which a UV curable solid state gel polymer electrolyte has been incorporated.

Electrochromic cells of the current invention include a first transparent substrate to which a first electrically conductive transparent electrode may be bonded. A first electrochromic layer may be bonded to the first electrically conductive transparent electrode. A second transparent substrate may be similarly coated with a second electrically conductive transparent electrode and a second electrochromic layer may then be bonded to the electrically conductive transparent electrode. A transparent UV curable solid state crosslinking gel polymer electrolyte may be placed between the first and second substrate such that the gel is in contact with both the electrochromic layers and there is substantially no contact between the electrochromic layers.

Substrates may be glass, plastic, ceramic or combinations of these, and include polycarbonate, polyphosphonate, polyethylene tetraphthalate or combinations thereof.

Embodiments of the present invention include electrochromic devices in which the first and second electrically conducting electrodes include, metal oxides, doped metal oxides, ITO, FTO, $SnO_2$, ZnO, AZO, $In_2O_3$, and combinations of these, and may include one or more electrochromic conducting polymer. In some embodiments, the electrochromic conducting polymer is PEDOT or PEDOT/PSS.

Embodiments of the UV curable solid state crosslinking gel polymer of the present invention may be made up of one or more macromonomer, a plasticizer, a photoinitiator, and an electrolyte salt. Embodiments of the gel polymer include macromonomers such as poly(ethyleneglycol)ethylether methacrylate (MA), poly(ethyleneglycol)diacrylate (DA) and combinations of these and may be vinyl macromonomers with poly(ethyleneglycol) side chains.

Photoinitiators for use in several embodiments of the gel polymer may be benzophenone, 2,2-dimethoxy-2-phenylacetophenone (DMPAP), dimethoxyacetophenone, xanthone, thioxanthone, and combinations of these.

In some embodiments of the present invention, the electrolyte salt may be lithium salts, $BF_4^-$, $ClO_4^-$, $CF_3SO_3^-$, $(CF_3SO_3)_2N$, and combinations of these.

In other embodiments, the plasticizer may be alkylene carbonate, propylene carbonate, ethylene carbonate and combinations of these, and is about 1% to 70% by weight of the macromonomer, preferably about 5 to 50%.

In particular embodiments of the present invention inert spacers are optionally dispersed within the gel polymer and act to keep the electrochromic layers from coming into contact with one another.

The first and second electrochromic layers may be deposited on the substrate using a variety of methods including, electrochemical deposition, spin coating, electrospinning, layer by layer self assembly, chemical casting composition, dip coating, ink jet printing or combinations of these formed on an electrode with a current density of greater than about 1 $mC/cm^2$.

In some embodiments of the present invention the first electrochromic layer is a cathodic electrochromic conducting polymer including PEDOT, PProDOT, PEDOP, PTT, PAEM-EDOT and combinations of these.

In other embodiments, the second electrochromic device is an anodic electrochromic conducting polymer including poly (BEDOT-NMCz), PPro-NPrS, and derivatives and combinations of these.

The first and/or second electrochromic layers may further include transition metal oxides, transition metal complexes, conducting polymers, viologens, polyaniline, polythiophene, $WO_3$, Prussian Blue and combinations of these.

The electrochromic cells of the present invention may also include a barrier coating of nanoparticles in a resin that prevents crazing of the substrate during electrodeposition of the electrochromic layer and during polymerization of the gel polymer.

Embodiments of the invention also include a method for making electrochromic cells in which a gel polymer of one or more macromonomer, a electrolyte salt, and a plasticizer are photopolymerized between electrically conducting electrochromic layers. The electrochromic layers may be bonded to transparent electrically conductive electrodes which may be bonded to transparent substrates.

The method of making an electrochromic device may be further described in some embodiments of the present invention which steps include; coating a first substrate with an electrically conductive transparent electrode, coating a second substrate with a second electrically conductive transparent electrode, coating the first coated substrate with a first electrochromic layer, coating the second coated substrates with a second electrochromic layer wherein the first electrochromic layer and the second electrochromic layer are different, covering the first coated substrate with the first electrochromic layer with a transparent, UV curable solid state cross linking gel polymer electrolyte mixture comprising one or more macromomoners, a plasticizer, a photoinitiator and an electrolyte salt, contacting the first coated substrate with the first electrochromic layer with the second coated substrate with the second electrochromic layer wherein the second electrochromic layer is in contact with the gel polymer electrolyte mixture and the first electrochromic layer is in contact with the gel polymer electrolyte mixture, and wherein there is substantially no contact between the first and second electrochromic layer, and sealing the layers between the first and second substrates wherein the device is substantially air and water tight. In some embodiments of the invention, bubbles are removed from between the substrates.

In some embodiments of the current invention, the electrochromic cell is sealed by encapsulating it with a gel, and in some embodiments, adhesive copper tape covers the perimeter of the substrate, Sealing the cell substantially eliminates the intrusion of water, air, oxygen and other compounds into the polymeric gel.

FIGURES

The file of this patent contains at least one drawing/photograph executed in color. Copies of this patent with color drawing(s)/photograph(s) will be provided by the Office upon request and payment of the necessary fee.

FIG. 1. is an illustration of a portion of an electrochromic display device.

Figure 2:
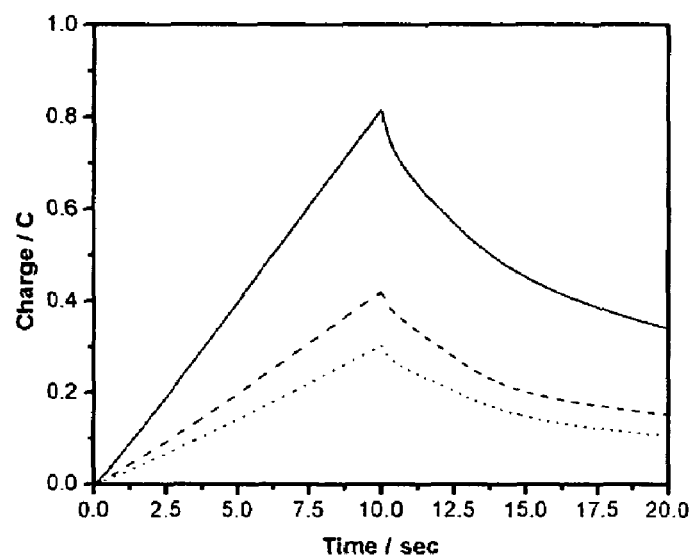

FIG. 2. shows chronocoulometric data obtained during polymerization of EDOT using metallic contact at one point (dotted line), one-side (dashed line), and whole perimeter (solid line) of the ITO glass.

FIG. 3. shows the relationship between charge density and polymerization time for a) PBENMCz and b) PEDOT.

Figure 4:
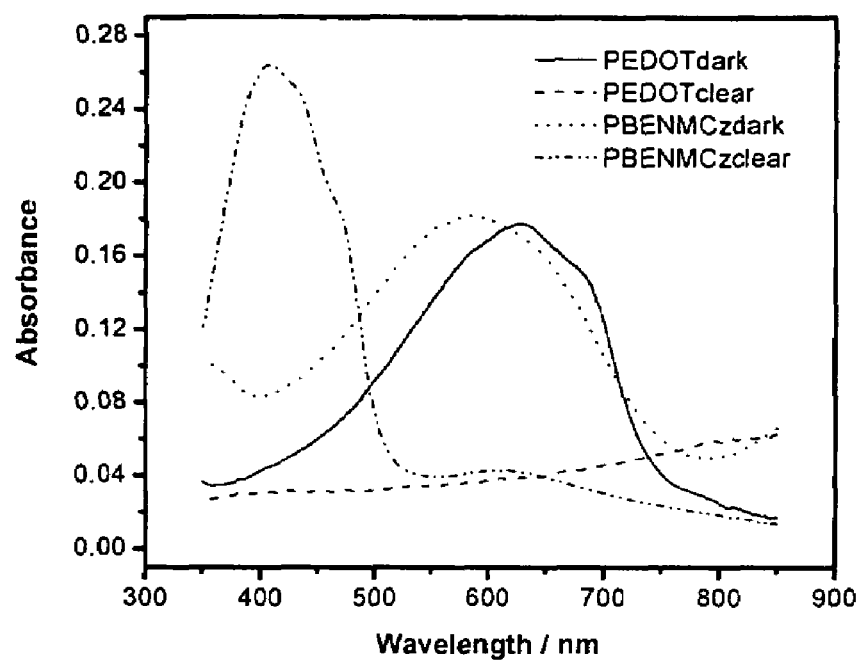

FIG. 4. shows absorbance spectra of PEDOT and PBENMCz in the visible region.

Figure 5:
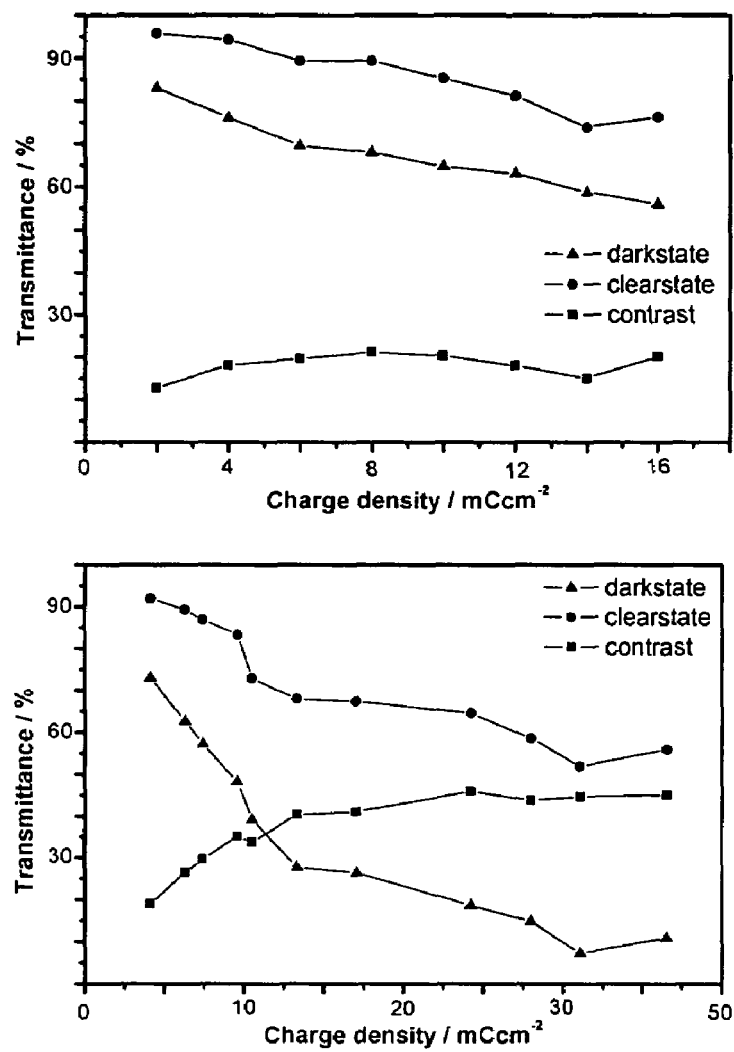

FIG. 5. shows the relationship between charge density and contrast for PEDOT and PBENMCz.

Figure 6:
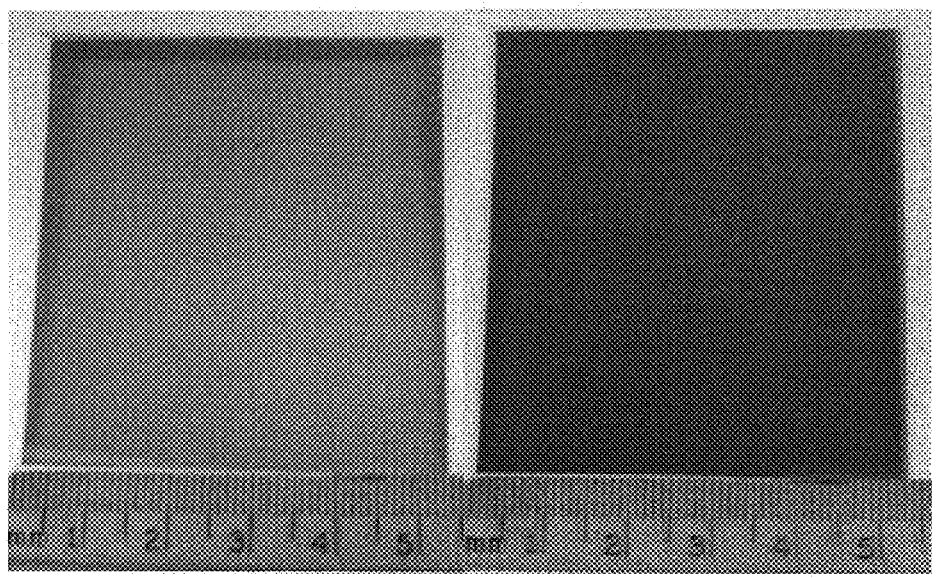

FIG. 6. shows a dual polymer solid state device with an electrochromic area of ~30 $cm^2$ in the clear (65%) and dark state (30%).

Figure 7:
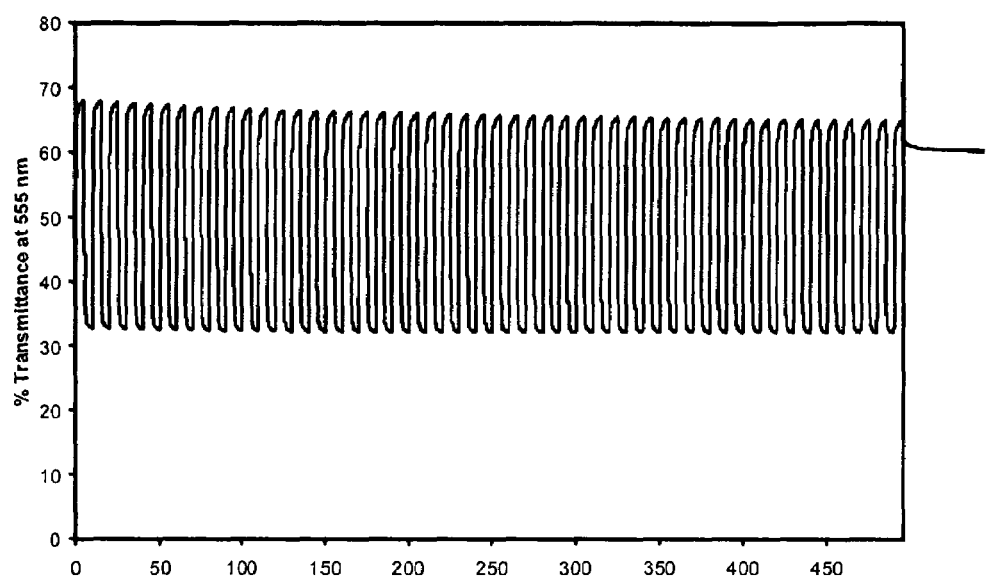

FIG. 7. shows a photopically weighted transmittance spectrum of a solid state device in the clear and dark states.

Figure 8:
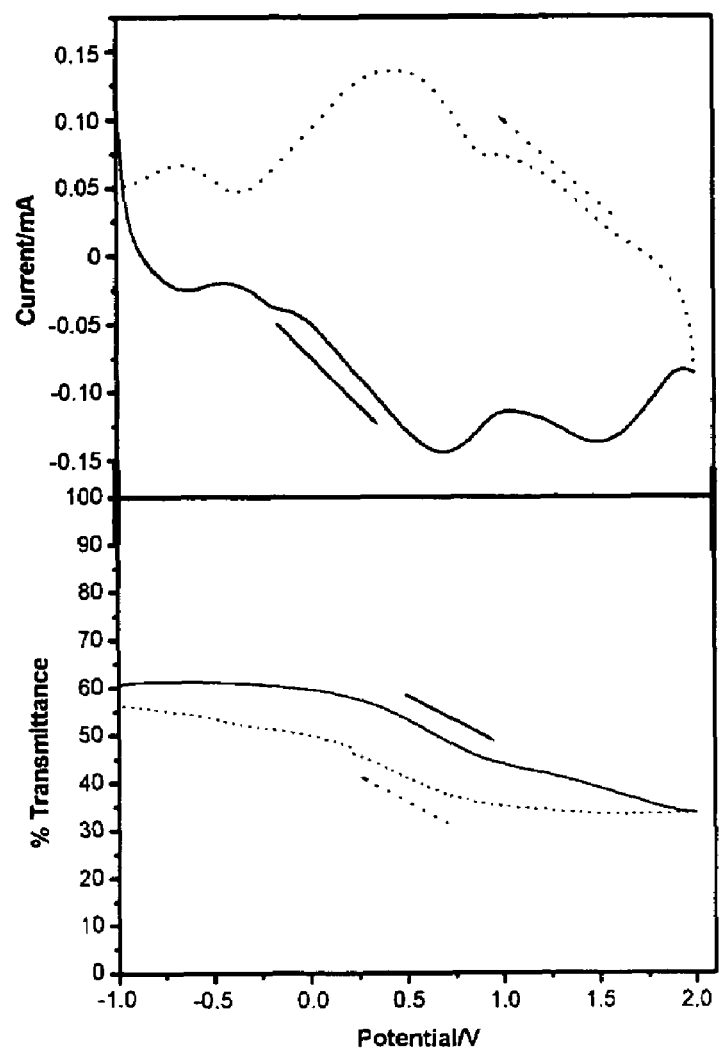

FIG. 8. shows current (top) and change in % transmittance (bottom) for a dual polymer solid-state device measured as a function of the applied potential (referenced against PEDOT containing electrode).

Figure 9:
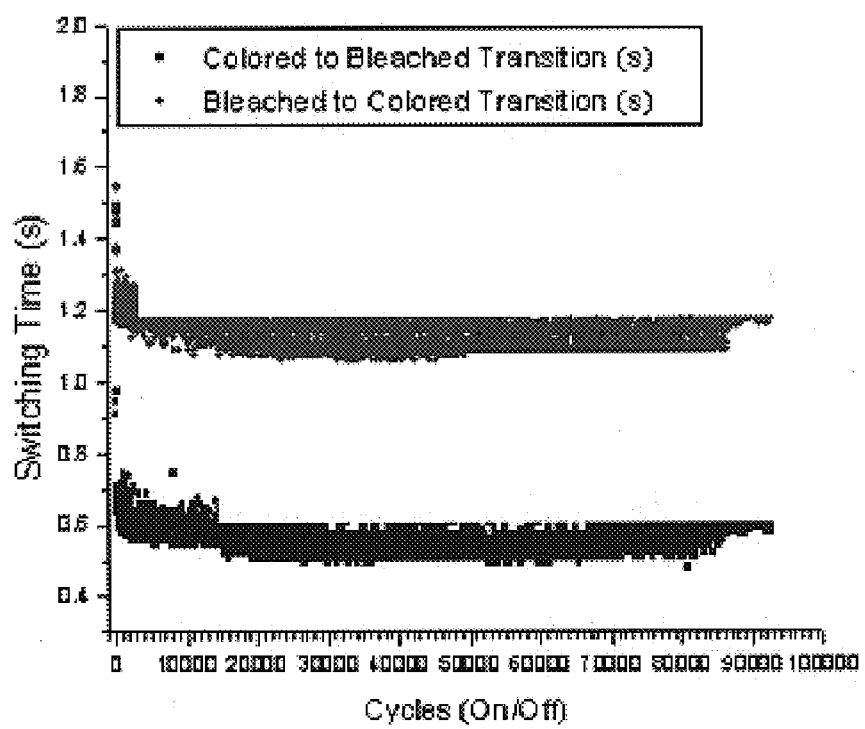

FIG. 9. shows the switching of a solid state device between −1 and 1.4 V for about 90 k times.

Figure 10:
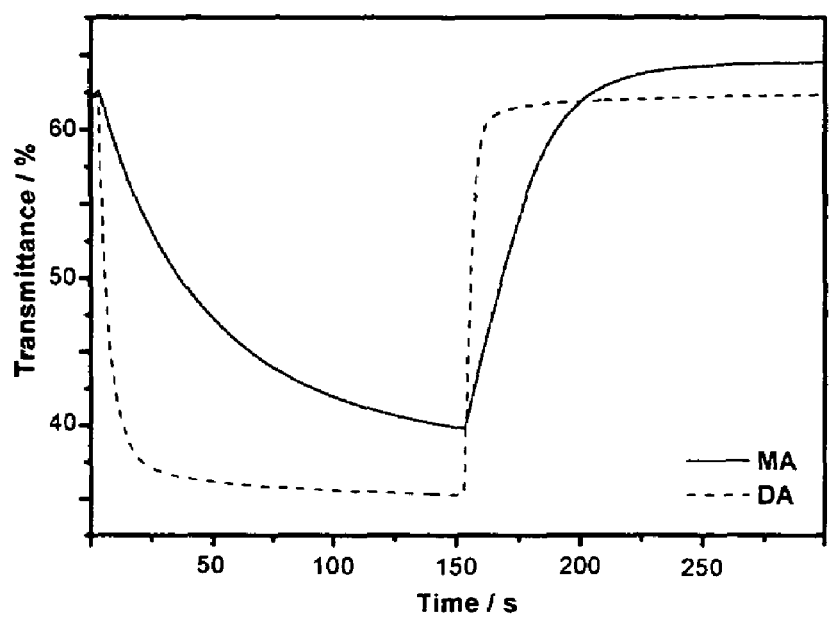

FIG. 10. shows the percent transmittance change at 550 nm during potential stepping experiments for devices containing pure MA and DA as electrolytes.

FIG. 11. shows the percent transmittance change at 550 nm for different electrolytes a) MA b) DA during constant potential stepping between −1 and 1.4 V.

Figure 12:
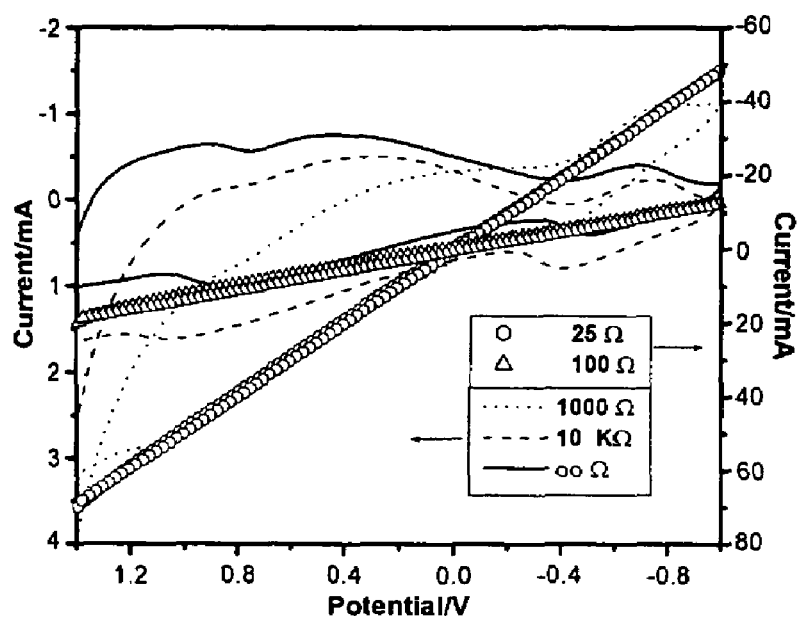

FIG. 12. shows cyclovoltammograms of a solid state electrochromic device with different resistors ($\infty\Omega$, 25 $\Omega$, 100 $\Omega$, 1 k$\Omega$, 10 k$\Omega$) in parallel.

Figure 13:
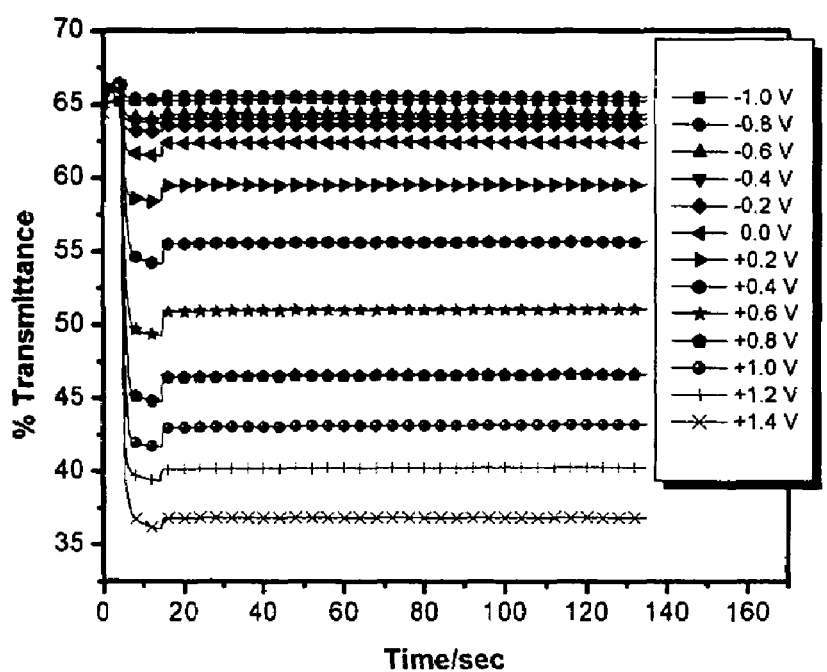

FIG. 13. shows the optical tunability of a solid state device at different potentials and the ability of the device to hold the different optical states even after turning off the power supply (The transmittance was measured at 555 nm).

DETAILED DESCRIPTION

Before the present compositions and methods are described, it is to be understood that this invention is not limited to the particular molecules, compositions, methodologies or protocols described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "cell" is a reference to one or more cells and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference. Nothing herein is to be construed as an admission that the invention is not entitled to antedate such disclosure by virtue of prior invention.

"Optional" or "optionally" means that the subsequently described event or circumstance may or may not occur, and that the description includes instances where the event occurs and instances where it does not.

"Transmittance" refers to the ratio of the radiant power transmitted through a material or device to the incident radiant power. Transmittance is usually expressed as a percent. For example, an electrochromic device with a 50% transmittance (at a specific wavelength) will absorb half of the light incident on it and allow half of it to pass through it.

"Contrast ratio" is the ratio of the transmittance in the colored state and the transmittance in the bleached state (at a specific wavelength) for an electrochromic device.

The "switching speed" of an electrochromic device is the time that an electrochromic device needs to change the optical density from the fully bleached state to the fully colored state.

The temperature range over which an electrochromic device can be operated properly is referred to as the "operating temperature".

Electrochromism refers to the reversible change in optical properties that occurs when a material is oxidized (loss of electrons and charge balance by transport of negative counter ions) or reduced (gain of electrons and charge balance by transport of positive counter ions). Polychromic materials may be used. Electrochromism includes devices that modulate radiation in the near infrared, thermal infrared, visible, and ultraviolet, and microwave regions. Electrochromic materials may be used with the photo-polymerized polymer electrolyte and may include but are not limited to transition metal oxides like $WO_3$, Prussian blue, viologens, conducting polymers like polyanaline and polythiophenes, transition metal complexes, and other materials.

The present invention encompasses electrochromic devices with gel polymer electrolytes that are capable of undergoing an electrochromic color change.

FIG. 1 shows a general construction of a transmissive type electrochromic display device. The display device has oppositely arranged front substrate 101 and back substrate 104, both may be transparent glasses, plastics, ceramics or combinations thereof. A transparent conductive film 102 like ITO is deposited on the inner surface of the front substrate 101, and, as a display working electrode, a first electrochromic layer 103 is formed on the conductive film 102. This display electrode is formed of a first type electrochromic material 103 which assumes a characteristic color in an electrochemically oxidized or reduced state. The inner surface of the back substrate 104 is coated with a transparent conductive film 105, and, as a counter electrode, a second electrochromic layer 106 is formed on the back or lower conductive film 105. The counter electrode formed of a second type electrochromic material 106 assumes a characteristic color in an electrochemically reduced or oxidized state, opposite to the state of the first electrochromic material 103. The two substrates are held spaced from each other and may be separated by a sealing material that is applied peripherally of the substrates to surround the electrochromic layers and prevent intrusion of contaminants into the display and prevent material from leaving the cell. The first electrochromic layer and the second electrochromic layer are separated by an electrolyte composition 107.

In some embodiments, the substrate may be transparent, rigid or flexible, curved, lightweight, impact resistant or a combination of these. Examples of suitable substrates include but are not limited to glass, ceramics and plastic, for example polycarbonate and polyphosphonate substrates may be used. The substrate supports a transparent conductive inner layer and may serve as a barrier against permeation and diffusion of chemical contaminants into the electrochromic medium, for example oxygen, water or other contaminants. Plastics in particular can be coated with layers that greatly reduce the permeation of contaminants into the cell.

The substrate may be coated with an electroconductive material, for example ITO, of sufficient thickness to allow electroconduction or may include layers of non-conducting transparent dielectrics such as, for example $TiO_2$ or $SiO_2$ coated on the plastic prior to coating with a transparent conductive material. Alternatively, the substrate may be impregnated with small transparent conductive particles.

Electrically conductive transparent materials that may be used for the coating on the inside of the substrate can include but is not limited to metal oxides such as $In_2O_3$, $SnO_2$, ITO, ZnO, or combination of these. These metal oxides can also be doped with traces of fluorides, antimony or aluminum to improve the conductivity. Other transparent conductive materials such as electrochromic conducting polymers, for example but not limited to PEDOT/PSS, or carbon nanotubes coatings may also be used.

A barrier polymer may be applied to the substrate to prevent diffusion and crazing of the substrate by solvents used in electropolymerization of the electrochromic layer as substrates that are used for electrochromic devices are generally susceptible to crazing in solvents like acetone, acetonitrile and other similar compounds. The barrier coating may be an epoxy-based nanocomposite coating created from a solution of nanometer sized particles suspended in an epoxy-containing matrix that can be used to coat and protect substrate and acrylic surfaces, making them more rugged and reliable. For example, ITO coated polycarbonates substrates will be damaged by crazing as they are exposed to acetonitrile solvent used in the electropolymerization of conducting polymers during the fabrication of conducting polymer-based electrochromic devices.

In another embodiment of the present invention, anti-scratch coating may be used as barrier coating for plastic substrates against acetonitrile. For example, Nanotuf® available from Triton Systems, Chelmsford, Mass. is a siloxane sol-get based nanocomposite coating created from a solution of nanometer sized particles suspended in an epoxy-containing matrix that may be used as a chemical barrier for polycarbonate substrates against solvent crazing or against acetonitrile crazing. However, similar tests using a silicon based anti-scratch coating for commercial eyeware and goggles did not prevent crazing a plastic substrate when place in acetonitrile for electropolymerization reactions.

Suitable substrates may be dip coated with a siloxane sol-gel based nanocomposite coating as described above. A transparent conductive coating such as but not limited to indium tin oxide may then be applied over the barrier coating. Immersion of the barrier coated substrates in acetonitrile, the media for electropolymerization of conducting polymers on the substrates, will precede the fabrication of dual conducting polymer-based electrochromic devices.

A cathodically electrochromic conducting polymer may be defined as a polymer that increases conductivity by donating positive charges. Cathodically electrochromic conducting polymers on a first electrode that may be used with the solid state polymer gel electrolytes of the present invention include but are not limited to optionally substituted polypyrroles, polyanalines, polythiophenes and others. In some embodiments the electrochromic conducting polymer for the first electrode are optionally substituted polythiophenes including but not limited to PEDOT or PEDOT prepared by electropolymerization.

Anodically electrochromic conducting polymers may be defined as polymers that increase conductivity by donating negative charges. Anodically electrochromic conducting polymers for the second electrode may be the same or different than the electrochromic conducting solid state polymer of the first electrode and include but are not limited to optionally substituted polythiophene including [poly(bis-EDOT-N-methylcarbazole)] commonly referred to as PBEDOT-NMeCz or PBENMCz. In some embodiments dual polymer devices use for example PEDOT, PTT, PAEM-EDOT with poly(BE-DOT-NMCz) and PAEBEDOT-NmeCz. The electrochromic polymers disclosed herein may be prepared from monomers such as 3,4-ethylenedioxythiophene (EDOT) and bis(3,4-ethylenedioxythiophene)-N-methyl carbazole (BENMCz). Other electrochromic polymers that may be used include those disclosed in Avni, A. Argun. et. al. Multicolored Electrochromism in Polymers: Structures and Devices, Chem. Mater. Reviews (2004) 16(23), 4401-4412 and U.S. Pat. No. 6,519,138 to Reynolds et al. the contents of which are hereby incorporated by reference in their entirety.

A potentiostat and an electrode may be used to electropolymerize PEDOT onto a transparent conductive substrates from an acetonitrile solution containing from about 20 mM to about 1 mM EDOT at about 1 to about 2.5 V preferably at about 1.3 V (vs Ag/Ag+). PBENMCz may be grown onto transparent conductive substrates from a solution containing about 0.5 to about 5.0 mM, preferably about 1 mM BENMCz with about 0.5 to about 1 M preferably about 0.1 M lithium salt at about 0.6 to about 1.2 V, preferably about 0.7 V (vs Ag/Ag+). FIG. 2 shows chronocoulometric data obtained during polymerization of EDOT using metallic contact at one point (dotted line), one-side (dashed line), and whole perimeter (solid line) of the ITO glass.

The gel polymer electrolyte generally contains a salt with high ionic conductivity at room temperature and, preferably, is easy to handle while preparing the electrolyte. Useful anions include but are not limited to $BF_4^-$, $ClO_4^-$, $CF_3SO_3^-$, $(CF_3SO_3)_2N^-$, and the like or combinations of these. The concentration of the electrolyte salt may be about 0.01 to about 20 wt % of the polymer, preferably from about 5 to about 20 wt %. In one embodiment the salt used in the electrolyte is a lithium salt. In a preferred embodiment, the salt in lithium trifluoromethanesulfonate (LITRIF). Ion transport evaluation of electrochromic devices may be performed using electrochemical quartz crystal microbalance (EQCM) techniques.

The gel electrolytes of the present invention may include a vinyl macromonomer with poly(ethylene glycol) side chains and may be prepared using the macromonomer, a photoinitiator and a plasticizer to compensate for the charge injected into or extracted from the conducting polymer. Examples of vinyl macromonomers that may be used to form the gel electrolyte can include but are not limited to poly(ethyleneglycol) ethylether methacrylate (MA), poly(ethyleneglycol) diacrylate (DA).

The gel may be prepared using a photoinitiator. Polymerization of the monolithic gel may be achieved using hydrogen abstracting photoinitiators including, but not limited to, benzophenone, 2,2-dimethoxy-2-phenylacetophenone (DMPAP), dimethoxyacetophenone, xanthone, and thioxanthone. In one embodiment the initiator may include 2,2-dimethoxy-2-phenyl-acetophenone (DMPAP). Polymerization may also be thermally induced at about 40° C. to about 70° C., preferablty about 50° C., using peroxide initiators such as benzyl peroxide (BPO) or azo bis isobutylnitrile (AIBN).

Plasticizers may be added to the photo-polymerized gel-electrolyte to modify the mechanical properties, charge transport, and switching response of the cell. These may be high boiling organic liquids and may include alkylene and alkylyne carbonates, such as but not limited to propylene and propylyne and their blends or other materials like dimethylformamide (DMF). The amount of plasticizer added to the gel polymer can range from about 0 to about 50% by weight, or about 10 to about 30% by weight. Higher percentages of plasticizer may be used if the cell is suitably sealed.

In assembling an electrochromic cell or device, the gel electrolyte solution may be poured onto the first conducting polymer electrode coated on a transparent conductive substrate at a thickness of about 5 to about 100 µm. The second conducting polymer electrode coated on another transparent conductive substrate may be then placed over the first conducting polymer electrode with the conducting surfaces facing each other. Inert spacers, such as for example glass beads may be dispersed in the gel electrolyte to keep the two electrodes from contacting one another in the solid-state device. The two electrodes may be pressed together to remove any trapped air bubbles and squeeze out excess gel electrolyte solution.

Polymerization of the macromonomer in the gel electrolyte may be carried out in at a suitable wavelength of light and temperature for a period of time that results in the polymerization or gel formation. For example, UV light from a lamp source can be used.

The device including two conductive substrates each having an electrochromic material electrode with a gel polymer electrolyte between them may be sealed together using polymer such as but not limited to a UV cross-linkable polymeric gel. The device may be further treated by encapsulating it in a resin to reduce or eliminate loss of any plasticizer used or reduce or eliminate the intrusion of contaminants like moisture and or oxygen into the cell. The quality of encapsulation may be tested by immersing the devices into a slightly acidified aqueous solution containing, for example, an Iron (III) thiocyanate complex. Poorly sealed devices are totally delaminated and the gel electrolyte may crack completely with uptake of the intensely colored dye. No change in the switching response (contrast and switching speed) was observed for well sealed devices even after subjecting the devices to vacuum at 75° C.

For electropolymerization over a large area, steps may be taken (i.e. the choice of electrode materials) to reduce a drop in potential along the surface and provide a more uniform deposition of electrochromic polymer films, thickness, with increasing distance from the applied potential contact point. For example, one way to provide a more uniform deposition is to cover the perimeter of the outer substrate plate with an adhesive copper tape. This leads to a lower gradient of the electric field all along the surface, leading to more uniform films. The charge density on the electrode may also be used to modify the polymerization and deposition uniformity. An increase in the charge density (i.e., rate of polymer deposition) leads to thicker films. Charge density can range from about 1 $mC/cm^2$ to about 50 $mC/cm^2$. In one embodiment, the electrochemical cell for electropolymerization allows use of an adhesive copper contact which is advantageous since in traditional electrochemical cells, all but one side of the plate is immersed in the solution. In one embodiment for making uniform electrochromic layers, the electrode materials, cell configuration and current density are adjusted to where the relationship between the charge density and time of polymerization are approximately linear as shown in FIG. 3a and 3b, and visually confirmed that the thickness gradient all along the surface was minimized.

The optical characteristics of the working and counter electrode materials chosen for the electrochromic device may have complementary colors or approximately complementary colors in the charged or neutral states. For example, the optical characteristics of PEDOT and PBENMCz are complementary. PEDOT is a cathodically coloring electrochromic conducting polymer that has been used in several electrochromic devices and goes from a transparent sky blue in its oxidized state to a deep indigo blue in the neutral state with a maximum absorbance centered at ~620 nm. PBENMCz goes from a pale yellow in the neutral form to a deep blue in its oxidized form ($\lambda$max in oxidized form=570 nm). The anodically coloring electrochromic PBENMCZ has been shown to be a suitable complementary polymer of PEDOT. Spectrums of both polymers were taken in their reduced and oxidized forms, and they are shown in FIG. 4..

Although the maximum change could be centered at one wavelength whenever the transmissive state of an electrochromic device is switched, the effect is distributed over the whole visible spectrum. One method for evaluating electrochromic devices is to show the data for photopic contrast calculated over the whole visible range instead on only calculating it in one particular wavelength. This method is successful as long as the devices are going to be used mostly under daylight conditions.

To obtain the contrast characteristics of electrochromic polymer used for the working and counter electrodes in a device, a series of electrochromic polymers prepared at various charge densities may be prepared. The transmittance spectrum of the polymers prepared with the different charge densities in the charged and neutral state can be measured. For example, the contrast characteristics of PEDOT and PBENMCz may be obtained from polymer films prepared with increasing charge densities. The transmittance spectrum of PEDOT in the neutral and oxidized forms may be recorded at constant potentials of −1.2 V and −0.15 V (vs Ag/Ag+) respectively. The neutral and oxidized form transmittance spectra of PBENMCz may be obtained at constant potentials of −0.7 V and 0.2 V (vs Ag/Ag+) respectively. The absorption of the substrate and transparent conductive electrode and the electrolyte solution are preferably subtracted. The photopic transmittance in the clear and dark states and the photopically weighted contrast (i.e., the difference between the values in the clear and dark states) may be calculated. The relationships between contrast and charge density as related to the thickness of the film for each polymer can be plotted as illustrated in FIGS. 5a and 5b.

One embodiment of an electrochromic display that includes electrochromic polymer electrodes and a gel electrolyte has a stable, variable transmission, at least 85% photopic at twilight and at least 30% photopic at daylight with fast-switching elements of about 0.1 to about 0.25 sec. In another embodiment the electrochromic display is a helmet mounted display (HMD's). In some embodiments, the electrochromic multi-layer, dual polymer devices with gel polymer electrolyte may use PEDOT, PTT, PAEM-EDOT with poly(BEDOT-NMCz) and PAEBEDOT-NMeCz on both flat and curved substrates.

The performance of fabricated electrochromic devices may be evaluated in terms of switching time and transmission contrast at environmental chambers under different humidity (30% to 90% relative humidity) and temperature (between −30° and 80° C.) conditions. These devices may be tested at reduced pressures. A cycling voltage to operate the cell may be determined by cycling cells at different voltages and monitoring changes in the % T in the clear state after a number of cycles. Potential cycling or stepping can be used to identify the preferred device voltage for a desired operating life. Other cell parameters that can be evaluated by potential cycling may include the rise time, switching time from dark to clear state, and fall time, switching time from clear to dark states of the solid-state devices.

In one embodiment of the present invention, the first electrochromic layer may be formed in a desired pattern such as a letter or image. The second electrochromic layer that serves as the counter electrode is formed over almost the entire effective surface area of the underlying conductive film. The first electrochromic layer patterns may be individually addressable and can be used to form pixels in a display.

Advantages of the compositions and devices described herein including a solid state gel electrolyte include improved safety for users, especially electrochromic display devices used in helmets, glasses and other devices located close to the eyes of the user. Other examples of devices or applications for the use of elctrochromic devices including gel electrolytes include but are not limited to mirrors, optical shutters, windows, goggles, color changeable eyewear, automotive windows, aircraft windows, welding visors or other devices that can change optical or more generally electromagnetic transmission as a result of an applied potential. Still further examples include readable displays.

Electrochromic devices may also be used in larger applications. For example, large area windows may be prepared that include two different conjugated polymers as working and counter electrode and a photo-polymerized gel including an electrolyte between them. Conjugated polymers that can be used include those whose interaction with electromagnetic radiation can be reversibly changed by application of an external voltage to the polymer to cathodically or anodically charge the polymer. These electrochromic polymers may be electrochemically grown or formed on large conductive transparent electrodes or other substrates coated with a transparent electrically conductive film. For example, visible light transparent conductive metal oxides like ITO coated glass and ITO coated poly(ethylene terephthalate) films can be coated with electropolymerized electrochromic polymers to form electrodes for the device. Although electropolymerization is preferred for making the polymer electrodes, chemical polymerization may also be used.

The examples below are merely representative of the work that contributes to the teaching of the present invention, and the present invention is not to be restricted by the examples that follow.

EXAMPLE 1

This example illustrates an electrochromic display device as illustrated in FIG. 1 having electrochromic working and counter electrodes, and a UV curable polymer gel electrolyte.

Materials: 3,4-Ethylenedioxythiophene (EDOT) and 3,6-dibromocarbazole were purchased from Aldrich, and EDOT was distilled under reduced pressure before use. bis(3,4-ethylenedioxythiophene)-N-methyl carbazole (BENMCz) was synthesized using methods known in the art. Dibromo-N-methyl carbazole was obtained in near quantitative yields by running the reaction for longer times (12 hours) at room temperature. Acetonitrile was procured from Fisher scientific and freshly distilled over calcium hydride (from ACROS). The PEDOT electrochromic electrode was grown electrochemically onto 3"×3" in ITO glass at 1.3 V (vs Ag/Ag+) from an acetonitrile solution containing 20 mM EDOT, while the PBENMCz electrochromic electrode was grown onto 3"×3" ITO coated PET from a 1 mM BENMCz solution with 0.1 M LITRIF at 0.7 V (vs Ag/Ag+). ITO glass and PET-ITO were used as substrates for the cell.

Both CHI 400 and CHI 660 A potentiostats were used for the electropolymerization of EDOT and BENMCz. These potentiostats were also used for the switching studies and other electrochemical characterizations of the solid state device. A UV lambda 900 spectrophotometer was used for the optical studies on the devices.

Electropolymerization of conjugated polymers could be performed in a cell designed for the electropolymerization on 3×3 inches plates but could be used for substrates of a variety of sizes.

PEDOT was grown in the oxidized transmissive sky-blue color form, was washed with acetonitrile and dried. PBENMCz was reduced to the pale yellow neutral form at −1 V washed with acetonitrile and dried before constructing the device.

Construction of Device. The gel electrolyte was composed of a vinyl macromonomers with poly(ethylene glycol) side chains (poly(ethyleneglycol)ethylether methacrylate (MA) and poly(ethyleneglycol) diacrylate (DA)), photoinitiator (2,2-dimethoxy-2-phenyl-acetophenone (DMPAP)), plasticizer (propylene carbonate) and an electrolyte salt (Lithium trifluoromethanesulfonate (LITRIF)) to compensate for the charge injected into or extracted from the conducting polymer. Several preparations of the gel electrolyte composition are shown in Table 1.

TABLE 1

Different composition of gels

| MA | DA | Propylene carbonate (plasticizer) | DMPAP (Photoinitiator) |
|---|---|---|---|
| 10 g | 0 g | 0 g | 25.0 mg |
| 9.0 g | 0 g | 1.0 g | 22.5 mg |
| 8.0 g | 0 g | 2.0 g | 20.0 mg |
| 7.0 g | 0 g | 3.0 g | 17.5 mg |
| 6.0 g | 0 g | 4.0 g | 15.0 mg |
| 5.0 g | 0 g | 5.0 g | 12.5 mg |
| 0 g | 10 g | 0 g | 25.0 mg |
| 0 g | 9.0 g | 1.0 g | 22.5 mg |
| 0 g | 8.0 g | 2.0 g | 20.0 mg |
| 0 g | 7.0 g | 3.0 g | 17.5 mg |
| 0 g | 6.0 g | 4.0 g | 15.0 mg |
| 0 g | 5.0 g | 5.0 g | 12.5 mg |

* 1.0 g Litrif and 5 mg of 50-100 mm glass beads (50-100 mm) were used in all compositions.

About 0.5 ml of the gel electrolyte solution was poured onto the PEDOT coated ITO glass and the PBENMCz coated PET-ITO glass was placed over it with the conducting surfaces facing each other. Glass beads were dispersed in the gel electrolyte to keep the two electrodes out of contact. The two electrodes were pressed together to remove any trapped air-bubbles and squeeze out excess gel electrolyte solution. Polymerization of the macromonomer in the gel electrolyte was carried out in the UV light (365 nm) for 15 min (1500 mJ/cm$^2$).

The device was then sealed using a polyurethane based UV curable resin to avoid loss of any plasticizer used or moisture affecting the gel electrolyte. The quality of sealing was tested by immersing the devices into a slightly acidified aqueous solution containing an Iron (III) thiocyanate complex.

EXAMPLE 2

This example illustrates characterization of devices and modification of electropolymerization variables to change device performance.

For electropolymerized (BENMCz) to form PBENMCz as made by Example 1, the contrast for PBENMCz was found to increase from a value of 15% for a charge density of 1 mC/cm$^2$ to an almost constant value of 20%. This value was found to be constant beyond a charge density of 2.5 mC/cm$^2$, while both the clear and dark state transmittance values were found to decrease with increasing polymer film thickness. For electroplymerized (EDOT) to form PEDOT on the electrode, a more dramatic increase (from 20% for a charge density of 4 mC/cm$^2$ to about 45% for charge densities about 24 mC/cm$^2$) was observed with increasing charge density. For practical applications, the transmittance for the clear state should be high enough to be useful even in moderate illumination conditions combined with a high enough contrast between the two states.

One way to obtain the maximum contrast in a dual polymer configuration was to make a series of different charge density films, ranging from $3\times10^{-3}$ to $2.8\times10^{-2}$ C/cm$^2$ for PEDOT, and from $1\times10^{-3}$ to $5.5\times10^{-3}$ C/cm$^2$ for PBENMCz, combining each film of one polymer with the whole group of the other, and then measured the contrast attained for each dual polymer configuration. It was determined from this set of experiments that improved contrast was shown with PEDOT and PBENMCz grown to charge densities of $1.5\times10^{-2}$ mC/cm$^2$ and $1.9\times10^{-3}$ mC/cm$^2$ respectively.

The above contrast values are for the conjugated polymers alone. The cell itself without the conjugated polymer may be made from materials that are transmissive throughout the electromagnetic region of interest, for example the infrared or the visible region. The devices in this example (ITO glass and PET-ITO), were found to have about 80% transmissivity throughout the visible region without the electrochromic materials. Furthermore, since transmittance and absorbance have a logarithmic relation, the maximum contrast achievable with the device is different. The contrast with different permutations and combinations was found to be about ~30% with the clear state transmittance at about 65% for polymerization charge densities of $9\times10^{-3}$ mC/cm$^2$ and $2.1\times10^{-3}$ mC/cm$^2$ for EDOT and BENMCz. FIG. 6 shows the solid state device with a clear state and dark state photopic transmittance of 65 and 35%. The photopically weighted transmittance spectrum of a device in the clear and dark state is shown in FIG. 7. A high clear state transmittance provides for good visibility with maximum contrast.

Cyclic voltammogram of the solid-state device was obtained using a two electrode configuration with the counter electrode and reference electrode shorted (with PEDOT coated ITO-glass as the counter electrode). FIG. 8 shows the cyclic voltammogram of a dual polymer solid-state device obtained at a scan rate of 100 mV/sec and the corresponding change in % transmittance. As the device is positively scanned from −1 V to 2.0 V the device goes from a clear to a dark state. At −1 V (i.e., clear state) PEDOT is in the conductive oxidized state and PBENMCz is in the insulating neutral state and at a potential of 2.0 V when the device is dark it is vice-versa. The onset for change in % transmittance was observed at 0.2 V and thereafter an increase in the % T values was observed till about 0.8 V, which corresponds to a peak potential as observed in the cyclic voltammogram, in a linear fashion. Above 0.8 V the slope for % T change drops but there is continued drop in the % T value till about 1.8 V and thereafter remains constant.

During the reverse scan the change in % T did not retrace the original path obtained during the forward scan indicating a hysteresis. This phenomenon was observed even at very low scan rates 10 mV/sec and also with 10 mM LITRIF solution in propylene carbonate. An asymmetry or hysteresis between the anodic and cathodic branches is observed in redox processes of conducting polymers. Energetic differences between doping and dedoping processes, may be related to asymmetric structural changes in the electrode materials necessary to complete them.

Multiple potential cycling between −1 and 2.0 V at a scan rate of 100 mV/sec were carried out on solid-state devices and it was observed that the % T in the clear state dropped leading to a reduction in the contrast (by ca. 4%) after 10 cycles. Potential cycling or stepping between −1 and 1.4 V was optimal in terms of the stability of the devices (i.e., reversibility of color change). Potential stepping experiments between −1 and 1.4 V (vs PEDOT containing electrode as the reference) indicate only a small loss in the contrast after 90,000 switches as shown in FIG. 9. Furthermore, there was no appreciable change in the rise time, switching time from dark to clear state, and fall time, switching time from clear to dark states of the solid-state devices.

EXAMPLE 3

This example illustrates how device performance can be related to electrode polymer composition, electrolyte composition, and preparation.

Several solutions based on macromonomer MA or DA mixed with different amounts of plasticizer, polycarbonate, were used as gel electrolytes for different devices. Solutions containing pure MA or DA, or 10, 20, 30, 40, 50% of PC for each one were prepared for this study. A solution of 10 mM LTRIF in PC was also used to show the differences between liquid and solid electrolyte. Potential steps between −1 to 1.4 V in the two electrode configuration were applied to devices constructed with these electrolytes, and spectrums at 555 nm were recorded so as to determine the switching speeds. The switching speed may be defined in this case as the time necessary to attain 90% of the maximum contrast. It was observed in this case that between the pure polymer electrolytes, DA shows a faster response than MA as illustrated in FIG. 10. When mixed with plasticizer, both macromonomerws showed improvement in the switching speed of the devices. It was observed for devices containing from 0 to 20% of plasticizer; the switching speed decreased from more than 90 secs to approximately 2 secs for MA, and from more than 10 secs to less than 2 secs for DA. Increasing the percentage of plasticizer to 30, 40 and 50% lead to slightly noticeable improvement (FIG. 11a and 11b).

Properly sealed devices with 100% PC solution inside showed slightly faster switching speeds. Devices corresponding to solutions containing 50% PC and 50% MA or DA showed 0.9 s and 0.8 s for bleaching switching speeds, respectively, while 100% PC devices showed 0.6 s. Coloring speed of MA and DA devices was in both cases of 1.5 s, while liquid electrolyte devices showed 1.1 s. These results are summarized in Table 2.

TABLE 2

Switching speeds for bleached to colored state transitions and vice-versa for gel electrolyte compositions.

| Gel Electrolyte composition | Switching speed/s (Coloring) | Switching speed/s (Bleaching) |
|---|---|---|
| 100% MA | 95.5 | 48.6 |
| 100% DA | 15.9 | 7.8 |
| 50% MA 50% PC | 1.5 | 0.9 |
| 60% MA 40% PC | 1.8 | 0.9 |
| 70% MA 30% PC | 2.2 | 1.1 |
| 80% MA 20% PC | 2.4 | 1.5 |
| 90% MA 10% PC | 6.3 | 3.1 |
| 50% DA 50% PC | 1.6 | 0.8 |
| 60% DA 40% PC | 1.5 | 1.1 |
| 70% DA 30% PC | 2 | 1.2 |
| 80% DA 20% PC | 2.4 | 1.5 |
| 90% DA 10% PC | 10.6 | 5.6 |

EXAMPLE 4

This example illustrates device characterization. The switching response from colored to bleached states is show in FIG. 10 for different macromonomers. The switching times from colored to bleached states for mixture of different macromonomers and different amounts of plasticizer are shown in FIGS. 11a and 11b.

Leakage current and device memory. It can be advantageous to retain the color of the display when power or potential is lost. Solid-state devices based on conjugated polymers are similar to batteries and store electrical charge when a potential is applied. In either of the states i.e., clear or dark, one of the conjugated polymers is in a positively charged state and any short-circuiting between the two electrodes leads to leakage of charge thus leading the device to loose its optical state. Depending upon the resistance between the two electrodes, the leakage of current will lead to a device in an equilibrium colored state. Cyclic voltammetry can be used to detect shorted devices from the non-shorted ones. FIG. 12 shows a series of cyclic voltammograms obtained with different known resistors in parallel to a non-shorted device.

Devices with smaller parallel resistance show a steep increase in the current as the potential is scanned back and forth, which is due to most of the electrons flowing through the external resistor. Furthermore, the device with 25 Ω resistance attained the equilibrium colored state faster than the one with 10 kΩ resistor (values).

FIG. 13 shows the optical tunability and memory retention of a solid state device at different potentials. The solid state device initially held at −1.1 V was pulsed to various potentials viz. −1 to 1.4 V and the power was turned off after 10 seconds of pulse width while the transmittance data at 555 nm was gathered for another two minutes. Except for a small increase (about 1-2%) in the % T just after turning off the potential the device was holding the different colored states for a long time to the order of several hours (although not shown here for clarity). As seen in FIG. 13 the drop in % T between −1 and −0.2 V is very gradual and then there is a faster drop in the % T values till about 0.8 V and again rate of change in % T with potential decreases till 1.4 V.

It was observed that a device in the clear state held its optical state for 4 days (this is not the upper limit) under open circuit conditions and this device was stored in ambient light conditions which indicates the strong resistance of the device to photo-oxidation. Also, no change in the switching response, visual change in initial contrast or switching speeds were observed at the end of this experiment.

Although the present invention has been described in considerable detail with reference to certain preferred embodiments thereof, other versions are possible. Therefore, the spirit and scope of the appended claims should not be limited to the description and the preferred versions contain within this specification.

What is claimed is:

1. A method for making an electrochromic device comprising:
    coating a first substrate with a first transparent electrically conductive electrode;
    coating a second substrate with a second transparent electrically conductive electrode;
    coating the first coated substrate with a first electrochromic layer;
    coating the second coated substrate with a second electrochromic layer wherein the first electrochromic layer and the second electrochromic layer are different;
    covering the first coated substrate with the first electrochromic layer with a transparent, UV curable solid state cross linking gel polymer electrolyte mixture comprising one or more macromonomers, a plasticizer, a photoinitiator and an electrolyte salt;
    contacting the first coated substrate with the first electrochromic layer with the second coated substrate with the second electrochromic layer wherein the second electrochromic layer is in contact with the gel polymer and the first electrolyte layer is in contact with the gel polymer, and wherein there is substantially no contact between the first and second electrochromic layer;
    polymerizing the UV curable solid state cross linking gel polymer electrolyte after contacting the first coated substrate with the first electrochromic layer with the second coated substrate with the second electrochromic layer; and
    sealing the layers between the first and second substrates wherein the device is substantially air and water tight.

2. The method of claim 1, wherein the first and second substrates are selected from glass, ceramic, plastic and combinations thereof.

3. The method of claim 1, wherein the amount of plasticizer is from about 1% to about 70% by weight of the macromonomer.

4. The method of claim 1, wherein the amount of plasticizer is from about 5% to about 50% by weight of the macromonomer.

5. The method of claim 1, wherein sealing the device comprises encapsulating the device with a UV cross linkable polymeric gel.

6. The method of claim 5, further comprising covering the perimeter of the outer substrate with adhesive copper tape.

7. The method of claim 1, wherein sealing the device substantially eliminates intrusion of water, air, oxygen or combinations thereof into the polymeric gel.

8. The method of claim 1, wherein the step of polymerizing is carried out in UV light.

* * * * *